US012624631B2

(12) United States Patent
Wind et al.

(10) Patent No.: US 12,624,631 B2
(45) Date of Patent: May 12, 2026

(54) GAMMA DETECTOR WITH RADIALLY LOADED SENSORS AND SPRING RETENTION ASSISTED ASSEMBLY

(71) Applicants: Stephen Wind, Lakeway, TX (US); William Tapie, Leander, TX (US)

(72) Inventors: Stephen Wind, Lakeway, TX (US); William Tapie, Leander, TX (US)

(73) Assignee: CBG Corporation, Austin, TX (US)

( * ) Notice: Subject to any disclaimer, the term of this patent is extended or adjusted under 35 U.S.C. 154(b) by 178 days.

(21) Appl. No.: 18/753,100

(22) Filed: Jun. 25, 2024

(65) Prior Publication Data

US 2025/0389183 A1      Dec. 25, 2025

(51) Int. Cl.
*E21B 47/017*      (2012.01)
*G01T 1/24*      (2006.01)

(52) U.S. Cl.
CPC ............ *E21B 47/017* (2020.05); *G01T 1/244* (2013.01)

(58) Field of Classification Search
CPC ..... E21B 47/017; G01T 1/244; G01T 1/2026; G01V 5/04
See application file for complete search history.

(56) References Cited

U.S. PATENT DOCUMENTS 5,869,836 A * 2/1999 Linden .................. G01T 1/2002
250/361 R
2010/0243905 A1* 9/2010 Jones ....................... G01V 5/04
250/361 R
2017/0184731 A1* 6/2017 Deere ....................... F16F 3/04

* cited by examiner

*Primary Examiner* — Courtney D Thomas
(74) *Attorney, Agent, or Firm* — Campbell Stephenson LLP

(57) ABSTRACT

A logging or measuring while drilling tool includes a semi-tubular housing base having first and second portions. A first semi-tubular lid is releasably connected to the first portion. The first semi-tubular lid and first portion of the semi-tubular housing base provides a first enclosure for containing a sensor. The sensor may be cylindrically shaped with an outer cylindrical surface that extends laterally between the first and second flat end surfaces. The outer cylindrical surface of the sensor may engage the first semi-tubular lid.

22 Claims, 11 Drawing Sheets

Top View

Side View

Cross Section View

Cross Section View

Top View

Side View

Top View

Top View

Side View

Right End View

Left End View

Top View

Cross Secitonal Side View

Cross Sectional View

Cross Sectional View

Cross Sectional View

Cross Sectional View

Bottom View

Side View

Cross Sectional View

Cross Sectional View

Cross Sectional View

Top View

Top View

Top View

Cross Sectional View

GAMMA DETECTOR WITH RADIALLY LOADED SENSORS AND SPRING RETENTION ASSISTED ASSEMBLY

BACKGROUND

This disclosure relates to tools used in oil and gas exploration. More specifically this disclosure relates to logging while drilling (LWD) tools or measuring while drilling (MWD) tools, which can be used for gathering real-time data during a drilling process. For ease of explanation only the present disclosure will be explained with reference to LWD tools, it being understood that this disclosure finds application in MWD tools as well.

LWD tools take measurements and/or aid in geo-steering while drilling for natural resources such as oil and gas. LWD tools are positioned adjacent drill bits and are subject to harsh operating conditions during drilling operations. For example, LWD tools are subject to substantial mechanical stress. As will be described below, components within LWD tools are sensitive to mechanical vibrations. LWD tools should be designed to mitigate the adverse effects on sensitive internal components from vibrations, including vibrations resulting from shock events, encountered by the tool during drilling operations.

BRIEF DESCRIPTION OF THE DRAWINGS

The present technology may be better understood, and its numerous objects, features, and advantages made apparent to those skilled in the art by referencing the accompanying drawings.

Figure 1:
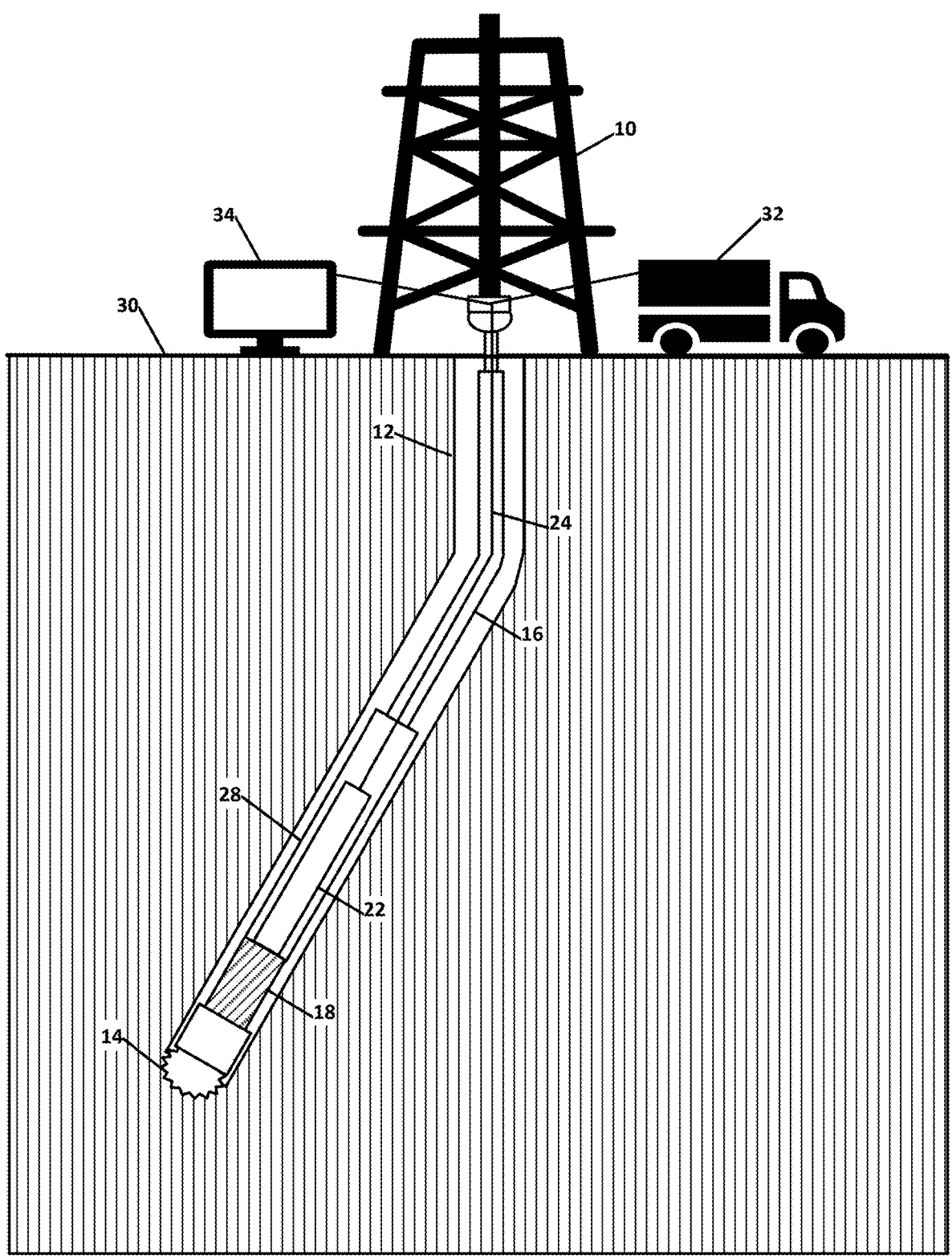
FIG. 1 illustrates a system used to drill a borehole.

While the invention is susceptible to various modifications and alternative forms, specific embodiments of the invention are provided as examples in the drawings and detailed description. It should be understood the drawings and detailed description are not intended to limit the invention to the form disclosed. Instead, the intention is to cover all modifications, equivalents and alternatives falling within the spirit and scope of the invention as defined by the appended claims.

DETAILED DESCRIPTION

FIG. 1 illustrates a drilling rig 10 cutting a borehole 12 into the earth, penetrating a subsurface geological formation. A drill string 16 passes through borehole 12 and is coupled to drilling rig 10. Drill string 16 may include drill bit 14, drill collars 28, and drill pipe. The lowest part of drill string 16 may include drill collars 28 and drill bit 14. Drill collars 28 are heavy walled pipe. The drill pipe is thinner walled.

Drilling rig 10 can turn drill bit 14, which cuts through the rock at the bottom of borehole 12. In some situations, drilling rig 10 turns drill bit 14 by attaching drill bit 14 at the lower end of drill string 16 and turning drill string 16 with powered equipment at the surface. Alternatively, as shown in FIG. 1, drill bit 14 may be driven by motor 18, which is adjacent to drill bit 14 in borehole 12. The illustrated arrangement is known as a "steering tool" system, in which drill string 16 does not need to rotate to turn the drill bit. However, drill string 16 can be turned to steer drill bit 14, to control the direction of advance of borehole 12, thus permitting the route of borehole 12 to be precisely steered as desired through the subsurface geologic formation.

LWD tool 22 is placed in drill string 16, near drill bit 14. If LWD tool 22 is used for geo-steering, it may be desirable to locate LWD tool 22 as close as possible to drill bit 14. In a steered system, LWD tool 22 may be placed above motor 18. LWD tool 22 receives power and returns data to the surface through a wire line cable 24 that is passed down the center of a non-rotating (or slowly rotating) drill string 16. In a system that uses a rotating drill string 16 to turn drill bit 14, LWD tool 22 may be placed just above drill bit 14, and a mud pulse data telemetry system (or any other appropriate telemetry method) can be used to return information to the surface.

LWD tool 22 can incorporate or be associated with one or more sensors that measure one or more properties of the geologic formation surrounding the LWD tool 22. These sensors can detect electrical currents, magnetic fields, radiation, or some other characteristic that can be measured and subsequently used to determine information about the geologic formation, which may be useful for the drilling process. LWD tool 22 can incorporate or be associated with a processing module and one or more storage devices to process and store measurements obtained using the sensors. LWD tool 22 can incorporate or be associated with telemetry or other communication equipment to transmit geologic information to the earth's surface.

Above the earth's surface 30, telemetry receivers and/or other appropriate communication equipment can be contained in a logging truck 32 located near drilling rig 10. Thus, communication equipment is positioned to receive and interpret geologic information generated by LWD tool 22 and its sensors, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the formation properties of the geologic formation currently near LWD tool 22 based on the geologic information from the LWD tool 22. In one embodiment, data display panel 34 can be part of a computing device (e.g., data display panel 34 can be rendered on the screen of a laptop computer used by an operator of drilling rig 10).

LWD tool sensors may take form in radiation sensors, it being understood the term sensor should not be limited thereto. Radiation sensors may be added to LWD 22 and designed to sense gamma photons emitted by a radioactive source near LWD 22. This may be very useful in drilling because it allows the identification of rock types by detecting known naturally occurring isotopes that emit gamma photons, such as uranium, potassium, and thorium. Detecting rock types (based upon the detected isotopes) in turn allows an operator to adjust the course of drilling if needed. The present disclosure is made with reference to gamma sensors it being understood that radiation sensors should not be limited thereto.

One type of gamma sensor uses one or more scintillation crystals, which detect gamma radiation by converting incident gamma photons into brief flashes of light (hereinafter light signals). A typical example is a single crystal or a series of crystals of sodium iodide doped with thallium. Other types of gamma sensors are contemplated.

LWD tool 22 can incorporate or be associated with a photomultiplier tube (PMT) to convert incident light signals from an optically coupled gamma sensor into electrical pulse signals (hereinafter PMT signals), which in turn can be processed to render useful information about the surrounding geological formation. PMTs may contain a photocathode, series connected dynodes, and an anode. Each dynode can be held at a more positive voltage, around 100 Volts, than the preceding one. Photons of a light signal from a gamma sensor may strike the photocathode to create a small group of primary electrons through a photoelectric effect. The number of primary electrons in the initial group may be proportional to the energy of the incident light signal. The primary electrons may move toward the first dynode by an electric field. They each arrive with around 100 eV. Upon striking the first dynode, more low energy electrons are emitted, and these electrons are in turn accelerated toward the second dynode. The geometry of the dynode chain is such that a cascade occurs with an exponentially increasing number of electrons being produced at each stage. The last stage is called the anode. The electrons reaching the anode results in a current pulse that is convertible into the PMT signal. A substantial supply voltage (e.g., 1200 Volts) may be needed across the series connected dynodes for the PMT to operate properly.

LWD tools may include signal threshold detectors to detect PMT signals from the PMT. The detected PMT signals can be counted to calculate a rate at which PMT signals are generated. The rate provides useful information about the geological formation surrounding the LWD tool. Signal threshold detectors may detect PMT signals with a voltage that exceeds a minimal level to filter out those PMT signals that are not considered reliable. PMT signals are usually very weak, however, and amplification may be necessary if the PMT signals are to be reliably detected and subsequently counted. A processing module and one or more storage devices in the LWD can process the amplified PMT signals for storage or subsequent transmission to the earth's surface for display on monitor 34.

Figures 2, 3, 4, 5:
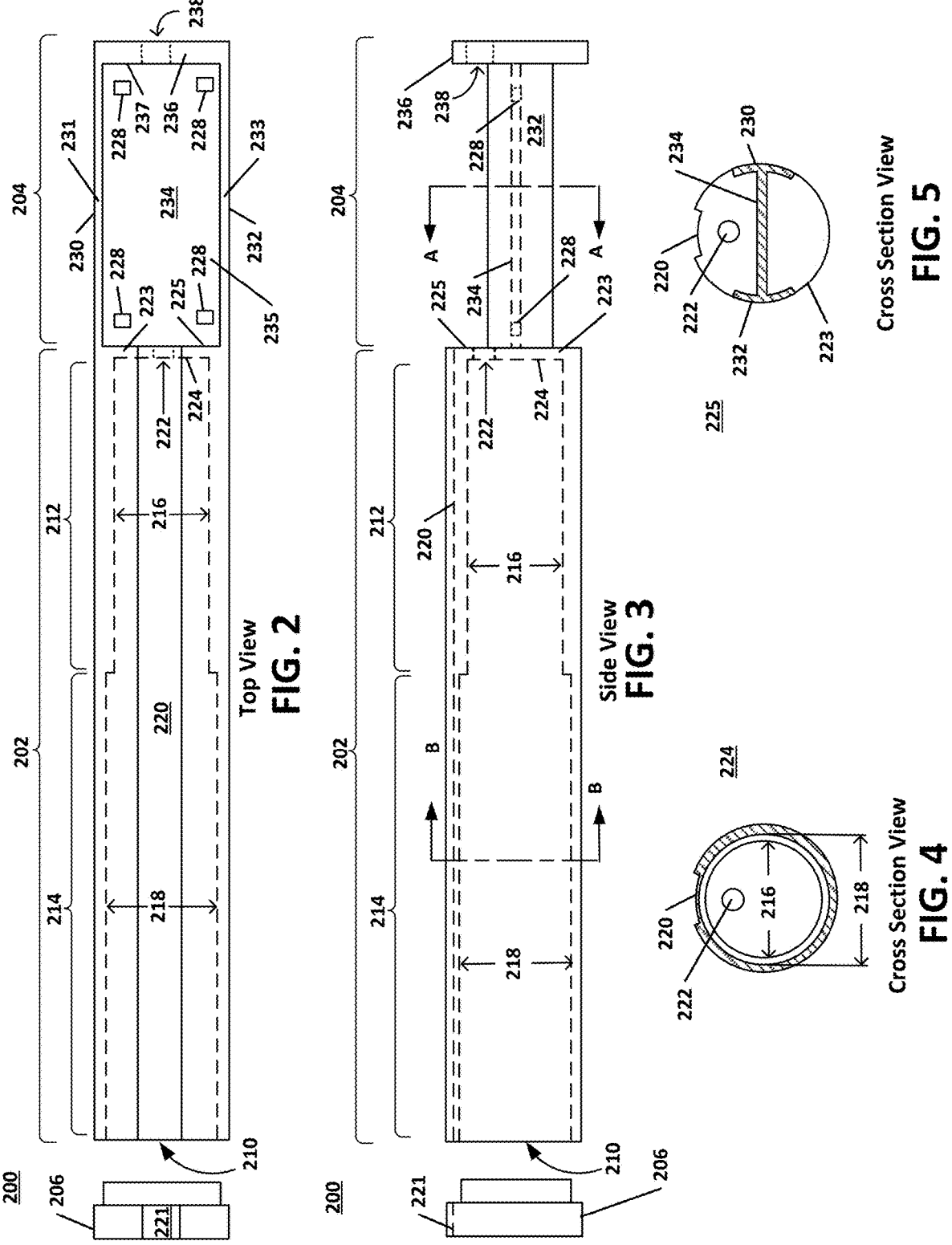
FIG. 2 is a top view of a housing for an LWD tool that can be used in the system of FIG. 1.
FIG. 3 is a side view of the example housing shown in FIG. 2.
FIG. 4 is a cross-sectional view of the example housing shown in FIG. 3 taken along line B-B.
FIG. 5 is a cross-sectional view of the example housing shown in FIG. 3 taken along line A-A.

FIGS. 2-5 illustrate an example housing 200 of LWD tool 22. As will be more fully described, housing 200 protects sensitive components such as gamma sensors or PMTs. FIG. 2 shows housing 200 when seen from above, and FIG. 3 illustrates example housing 200 when seen from the side. FIGS. 4 and 5 illustrate cross-sectional views of housing 200 taken along lines A-A and B-B, respectively, of FIG. 3.

Housing 200 is generally cylindrical in shape. Cylindrical coordinates are typically used as terms of reference for drilling tools. There are three orthogonal directions: axial, radial, and azimuthal. The axial direction runs along the length of the housing 200. The radial direction extends though and is perpendicular to the center axial axis of housing 200. Finally, the azimuthal direction is a direction in which the cylinder out housing 200 can rotate around its center axial axis.

Housing 200 can be formed (e.g., machined) from a solid piece of metal (e.g., aluminum). Housing 200 includes a tubular section 202 and semi-tubular section 204. Slot 220 is formed in the outer surface of tubular section 202 and is configured to receive a set of wires that can transmit data signals, electrical power, or both. Slot 220 extends between opposite ends of tubular section 202. A substantially cylindrical end cap 206 can be received at an open end 210 of the tubular section 202. Cylindrical end cap 206 is shown from above and from the side in FIGS. 2 and 3, respectively.

Tubular section 202 includes a first cylindrically shaped chamber 212 (represented by hidden lines in FIGS. 2 and 3) with diameter 216, and a second, counterbored cylindrically shaped chamber 214 (represented by hidden lines in FIGS. 2 and 3) with diameter 218. Chambers 212 and 214 may have different diameters 216 and 218, respectively. As will be more fully described below, chamber 212 is configured to receive a cylindrically shaped PMT, and chamber 214 is configured to receive a cylindrically shaped gamma sensor.

Semi-tubular section 204 includes a pair of curved side walls 231 and 233 with opposite facing curved surfaces 230 and 232. A rectangular, flat mounting bracket 235 with flat surface 234 extends between and is integrally connected at its long ends with curved side walls 231 and 233. Bracket 235 also extends between and is integrally connected at its short ends with end walls 223 and 236. Bracket 235 includes apertures 228 (represented by hidden lines in FIG. 3). Wires can extend through apertures 228 as will be more fully described. Mounting surface 234 can receive a printed circuit board (PCB) as will be more fully described below. Aperture 238 (represented by hidden lines in FIGS. 2 and 3) is formed through end wall 236. As will be explained below wires connected to the PCB mounted on surface 234 of bracket 235, may extend through aperture 238. Aperture 222 (represented by hidden lines in FIGS. 2 and 3) is formed through end wall 223. As will be explained below wires electrically connecting a PMT in chamber 212 to a PCB mounted on surface 234 of bracket 235, may extend through aperture 222 FIG. 4 shows the cylindrical and tubular nature of section 202. FIGS. 4 and 5 show slot 220 in the outer wall of section 202. Slot 220 has surface 221 that can carry wires.

Figures 6, 7, 8:
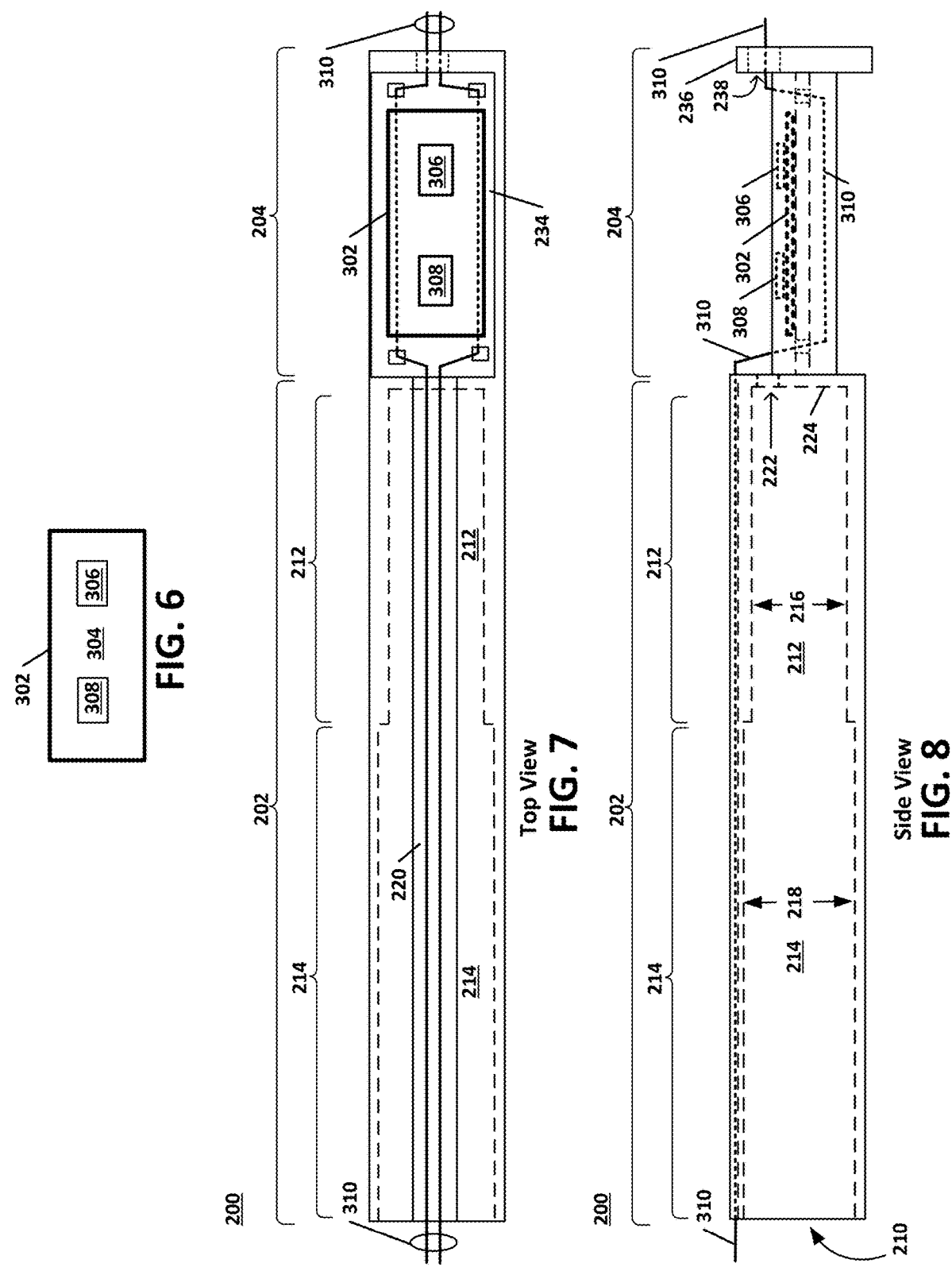
FIG. 6 is a top view of an example PCB and wire harness.
FIG. 7 shows the PCB, and external routing of the wire harness, of FIG. 6 received in the housing of FIG. 2 when seen from above.
FIG. 8 shows the PCB and housing of FIG. 7 when seen from the side.

FIG. 6 illustrates an example PCB 302 having an upper surface 304 on which packaged circuits 306 (e.g., a signal amplifier) and 308 (e.g., a signal detector) are mounted. Other packaged circuits, such as a data processing module, can be mounted on surface of PCB 302 opposite surface 304. Although not shown, metal leads may extend from packaged circuits mounted on PCB 302 including packaged circuits 306 and 308. The ends of these leads may be connected (e.g., soldered) to metal traces (not shown) on PCB 302. A set of wires 310 art shown. Wire set 310 sits in slot 220. Wires of set 310 pass through apertures 228, extend below PCB 302 and bracket 235, and pass through aperture 238. Wire set 310 can carry signals and/or electrical power.

FIGS. 7 and 8 illustrate housing 200 shown in FIGS. 2 and 3 with PCB 302 mounted to surface 234 of bracket 235. These figures also show wire set 310 positioned in slot 220 of tubular portion 202. Because wire set 310 is positioned outside tubular portion 202, wire set 310 is exposed to the environment. Wire set 310 and PCB 302 may be covered with potting material to protect the wire set and PCB from environmental factors. Epoxy and polyurethane are common materials used for potting. When cured, potting material can insulate wire set 310 and PCB 302 from electrical, thermal, and mechanical stress. The potting material can also prevent wire set 310 from displacement during a drilling operation. FIGS. 7 and 8 also show wire set 312 extending through aperture 238 of end cap 236.

Figures 9, 10, 11:
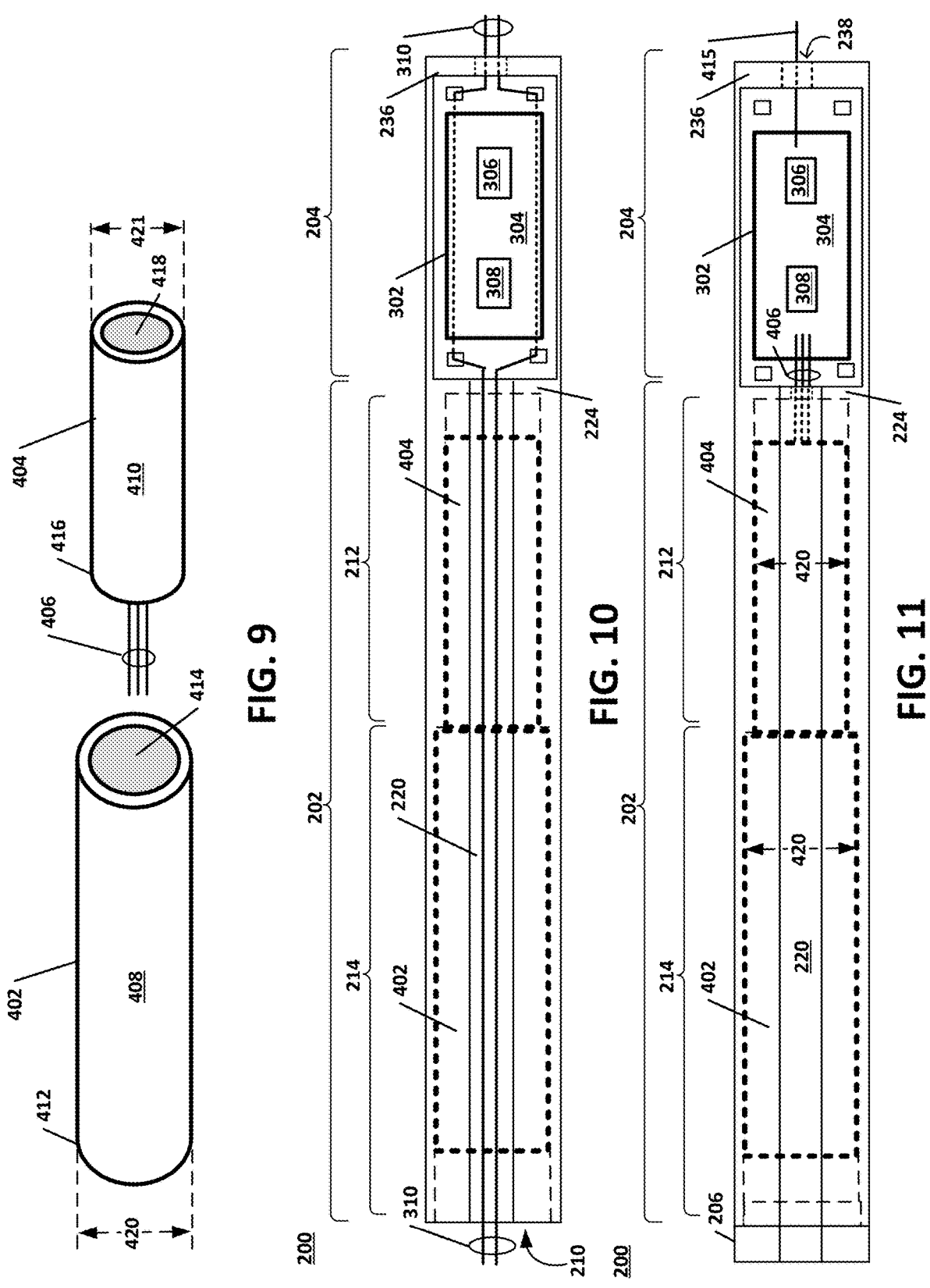
FIG. 9 illustrates an example radiation sensor and PMT.
FIG. 10 shows the housing of FIG. 3 with FIG. 9's radiation sensor and PMT inserted therein.
FIG. 11 shows the housing of FIG. 10 sealed with an end cap.

FIG. 9 shows an example gamma sensor 402 and an example PMT 404 that can be axially inserted into open end 210 and received by housing 200. Both devices are cylindrical and have outer cylindrical surfaces 408 and 410, respectively. Gamma sensor 402 has an outer cylindrical surface diameter 420 that is greater than the outer cylindrical surface diameter 421 of PMT 404. Gamma sensor 402 has a light transparent window 414 through which gamma-radiation-induced light signals may be transmitted to PMT 404. PMT 404 also includes a light transparent window 418 for receiving the light signals from gamma sensor 408. As will be more fully described below, after gamma sensor 402 and PMT 404 are inserted axially into cylindrical chambers 214 and 212, respectively, light transparent windows 414 and 418 directly face each other. In this configuration, when gamma sensor 402 generates light signals in response to detecting gamma radiation, the light signals are detected by PMT 404. PMT 404 includes a set of wires 406 for transmitting electrical power and PMT signals.

FIGS. 10 and 11 show the housing 200 of FIG. 3 after PMT 404 and gamma sensor 402 are axially inserted into chambers 212 and 218, respectively, through open end 210. PMT 404 and gamma sensor 402 are represented by hidden lines in FIGS. 10 and 11. FIG. 11 also shows end cap 206 inserted into the open end 210 of chamber 214 after chambers 212 and 218 receive PMT 404 and gamma sensor 402. For ease of illustration, wires 310 are not shown in FIG. 11. However, FIG. 11 shows wires 406 extending through aperture 222. Ends of wires 406 can be soldered to metal traces of PCB 304. One or more additional wires 415 may be soldered to respective traces on PCB 302. These additional one or more wires 415 may also extend through aperture 238 along with wire set 310.

LWD tool housings, including housing 200, are typically formed (e.g., machined) from a solid piece of metal. While modern machines (e.g., milling tools, drills, etc.) for manufacturing housings are more accurate than ever, every machine has inherent mechanical limits to its precision. The way the piece of metal is held in the machine can influence machine accuracy. Localized heat generated during machining can cause materials to expand, affecting their dimensions during the process. Cooling afterwards can lead to contraction, which might not always be completely uniform. Improper machine setup can lead to misalignment, and part movement during the machining process. Some or all these inaccuracies can cause deviations from specified tolerances such as deviations in the diameters 216 and 218 along the axial length of chambers 212 and 214, respectively.

With continuing reference to FIGS. 2, 3, 10, and 11, diameter 216 may not be uniform between the ends of chamber 212, and diameter 218 may not be uniform between the ends of chamber 212 due to inaccuracies during the process of machining chambers 212 and 214. The non-uniformity of diameters 216 and 218 may prevent PMT 404 and gamma sensor 402 from fitting snugly (i.e., with limited movement in the axial and/or radial directions) in chambers 216 and 218, respectively. If the PMT and gamma sensor do not fit snugly, the PMT and/or gamma sensor may rattle inside 216 and 218, respectively, during a drilling operation.

Gamma sensors and/or PMTs are sensitive to rattle (i.e., vibration) inside housing 200 during the drilling operation due to their operating principles and the nature of their detection mechanisms. Vibration or rattle during the drilling process can introduce mechanical disturbances to the gamma sensor. These disturbances can disrupt the uniformity of the gamma sensor crystal lattice structure, leading to a phenomenon known as "triboluminescence." Triboluminescence light is generated through the breaking of chemical bonds in a material when it is pulled apart or otherwise mechanically disturbed. As a result of vibration induced triboluminescence, the gamma sensor may produce false light signals. The electrical signals produced by the gamma sensor, including electrical signals produced by false triboluminescence light, are amplified by the PMT. This can make it difficult to distinguish between true light signals caused by gamma radiation and false signals caused by mechanical vibrations, leading to inaccuracies in the measurements of gamma radiation. The potential for such false signals can lower confidence in the LWD tool's output and potentially increase the time needed for drilling by causing operators to spend extra time verifying all the LWD tool's output signals. The sensitivity of gamma sensor to vibration can significantly impact the quality and accuracy of the data collected by the LWD tool. Inaccurate measurements of gamma radiation can lead to misinterpretations of the geological formations encountered during drilling. The false signals could be interpreted by drilling operators as a change in rock properties, which in turn could lead to the course of drilling being altered erroneously.

FIGS. 10 and 11 show the outer cylindrical surfaces of PMT 404 and gamma sensor 402 contacting the inner cylindrical surfaces of chambers 216 and 218, respectively, over the entire axial and azimuthal lengths of cylindrical chambers 216 and 218, respectively. In other words, these figures presume PMT 404 and gamma sensor 402 fit perfectly inside chambers 412 and 416, respectively. If this was possible, PMT 404 and gamma sensor 402 would not rattle inside chambers 212 and 214, respectively, during a drilling operation. Unfortunately, chambers 212 and 214 cannot be perfectly machined to create constant diameters 216 and 218, respectively, over their entire axial lengths. At best, chambers 212 and 214 can be made with diameters that fall within acceptable tolerances. For example, chamber 212 can be machined to have a diameter 218 with a tolerance of 0.005" over its entire axial length.

Sensor 402 and PMT 404 can be manufactured with diameters 420 and 421 that accommodate the tolerances of diameters 216 and 218, respectively, but only to a certain degree. This means that gaps may exist between the outer cylindrical surfaces 410 and 408 and inner cylindrical surfaces of chambers 212 and 214, respectively, near one or both ends thereof. The gaps enable rattling of gamma sensor 402 and/or PMT 404 inside chambers 212 and 214 during a drilling operation, which may lead to the generation of erroneous PMT signals.

Figures 12, 13:
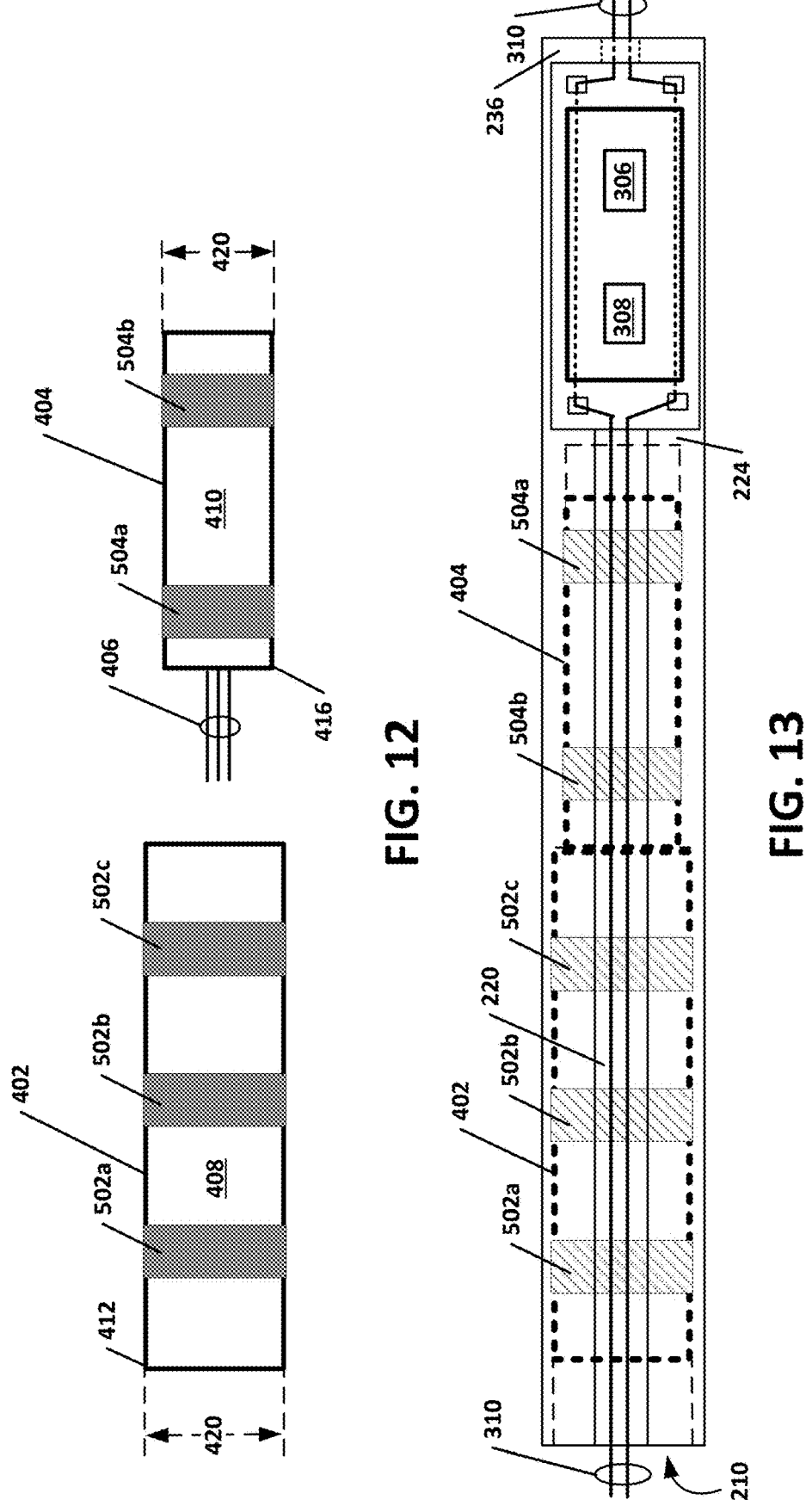
FIG. 12 shows radiation sensor and PMT of FIG. 9 with tape strips adhered thereto.
FIG. 13 shows the housing of FIG. 3 with FIG. 12's radiation sensor and PMT inserted therein.

FIG. 12 shows gamma sensor 402 and PMT 404 with thin strips of tape (e.g., a polyimide film tape such as Kapton) 502 and 504 adhered to the outer cylindrical surfaces 408 and 410, respectively. If tape strips 502 and 504 are positioned strategically on sensor 402 and PMT 404, respectively, to accommodate nonuniformities of diameters 216 and 218, respectively, along the axial length of chambers 214 and 212, respectively, tape strips 502 and 504 may reduce rattle of sensor 402 and PMT 404 that would otherwise occur if sensor 402 and PMT 404 were inserted into chambers 212 and 214, respectively, through open end 210 without the tape. The tape can also act as a cushioning layer, absorbing shocks and reducing the impact of vibrations on the sensitive components.

FIG. 13 shows the taped sensor 402 and taped PMT 404 represented inside chambers 214 and 212, respectively, with hidden lines. FIG. 13 presumes that tape strips 502 and 504 remain in their position as PMT 404 and sensor 402 are axially inserted into chambers 212 and 214, respectively, through open end 210. Moreover, FIG. 13 presumes that the outer surfaces of tape strips 502 and 504 contact the inner surfaces of chambers 214 and 212, respectively. If tape strips 502 and 504 remain intact and at their initial position on surfaces 408 and 410 of sensor 408 and PMT 410, respectively, and if the outer surfaces of tape strips 502 and 504 contact inner surfaces of chambers 214 and 212, respectively, sensor 408 and PMT 410 should experience reduced radial movement inside housing 200 during a drilling operation. Unfortunately, a lack of uniform diameters 216 and 218 may prevent a snug fit of taped sensor 408 and taped PMT 410 inside chambers 214 and 212, respectively. To illustrate, if diameter 216 is narrowed at a point near the open end of chamber 212, tape strip 504b may be damaged or displaced from its initial position on PMT 404 as PMT 404 and its tape strip 504b is pushed past the narrowed point of diameter 216 while in contact therewith. The damage or displacement could lead to a gap between the outer cylindrical surface of PMT 404 and the inner cylindrical surface of chamber 212, which in turn may cause PMT 404 to rattle inside chamber 212 during a drilling operation. Likewise, if diameter 218 is narrowed near the open end 210 of chamber 214, tape strip 502a may be damaged or displaced off its initial position on sensor 402 as sensor 402 and its tape strip 502c is pushed over the narrowed point of chamber 214. This too could lead to a gap between the outer cylindrical surface of sensor 402 and the inner cylindrical surface of chamber 214, which in turn may cause sensor 402 to rattle inside chamber 214 during drilling operation.

Figures 33, 34, 35:
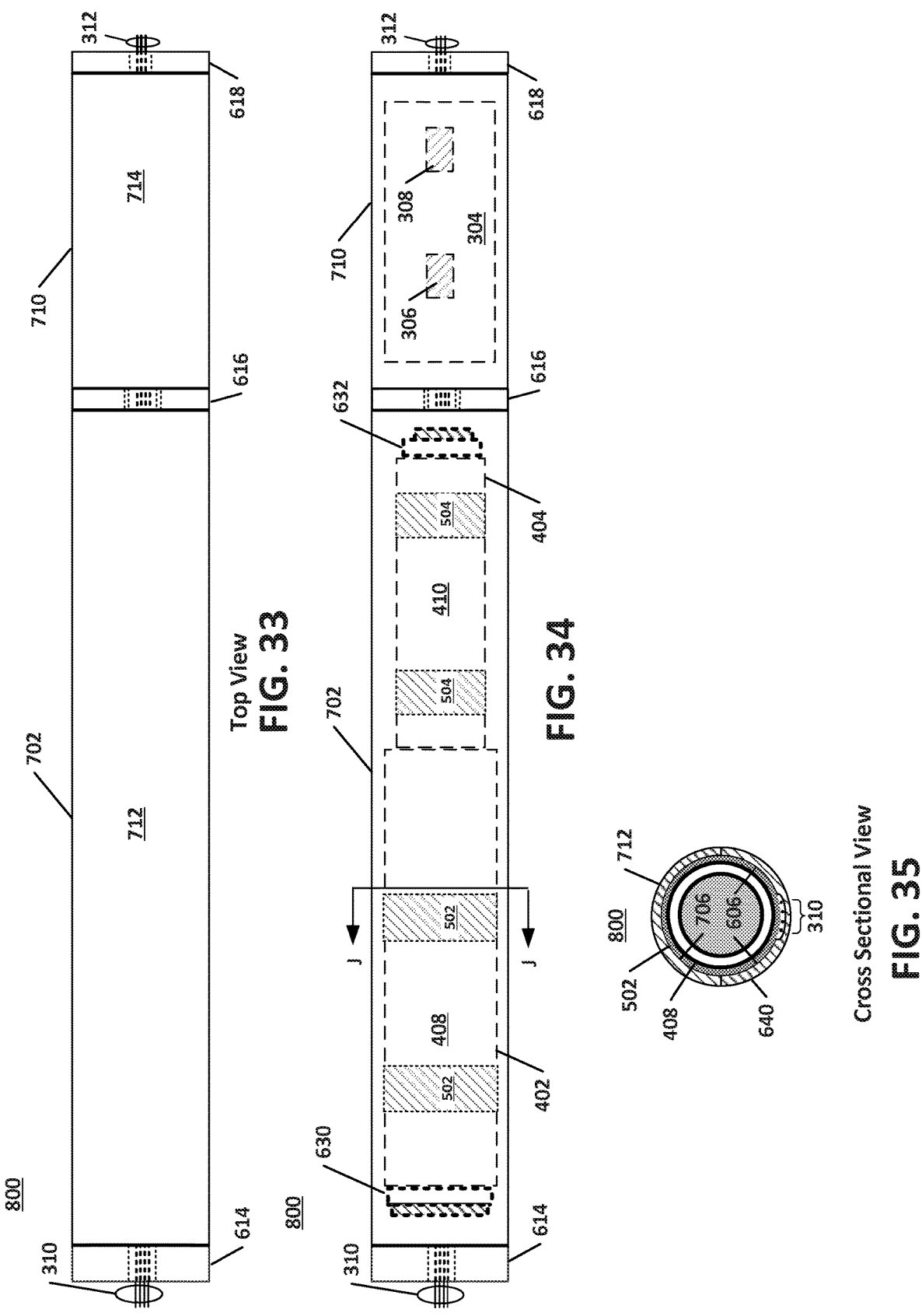
FIG. 33 shows the housing base of FIG. 32 when seen from above with the first and second lids attached thereto.
FIG. 34 shows the housing of FIG. 33 when seen from above with certain components shown with hidden lines.
FIG. 35 is a cross-sectional view of the housing and components shown in FIG. 34 taken along line J-J.

Disclosed is an alternative LWD housing that addresses the problems described above and others. FIGS. 14-29 show LWD housing components, which includes a base structure 600, a first lid 712 and a second lid 714. First and second lids 712 and 714 can seal respective side openings in the base that extend axially along its length. FIGS. 14-23 show top, side, and cross-sectional views of base 600. FIGS. 24-29 show top, side, and cross-sectional views of first lid 702 and second lid 714. The LWD housing of the present disclosure can be assembled by attaching (e.g., fastening using threaded screws) first lid 712 and second lid 714 to base 600. FIG. 33 shows first lid 712 and second lid 714 releasably attached to base 600 to create LWD housing 800.

Figure 14A:
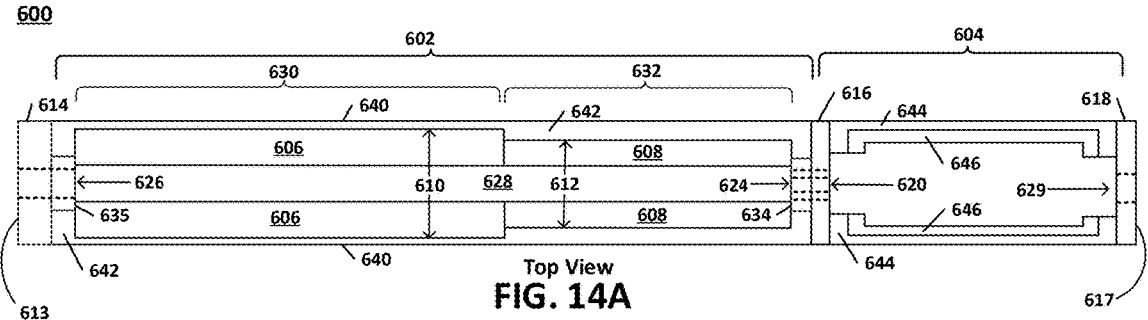
FIGS. 14A and 14B are top views of a housing base for an LWD tool that can be used in the system of FIG. 1.
Figure 14B:
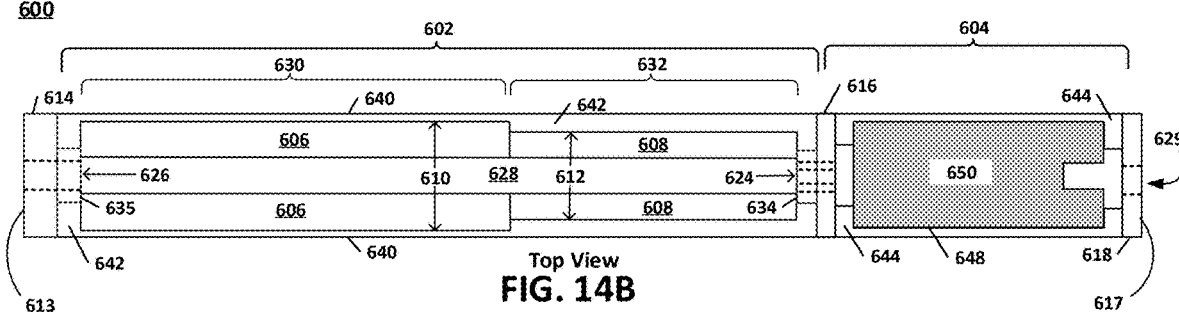
Figures 15, 16, 17:
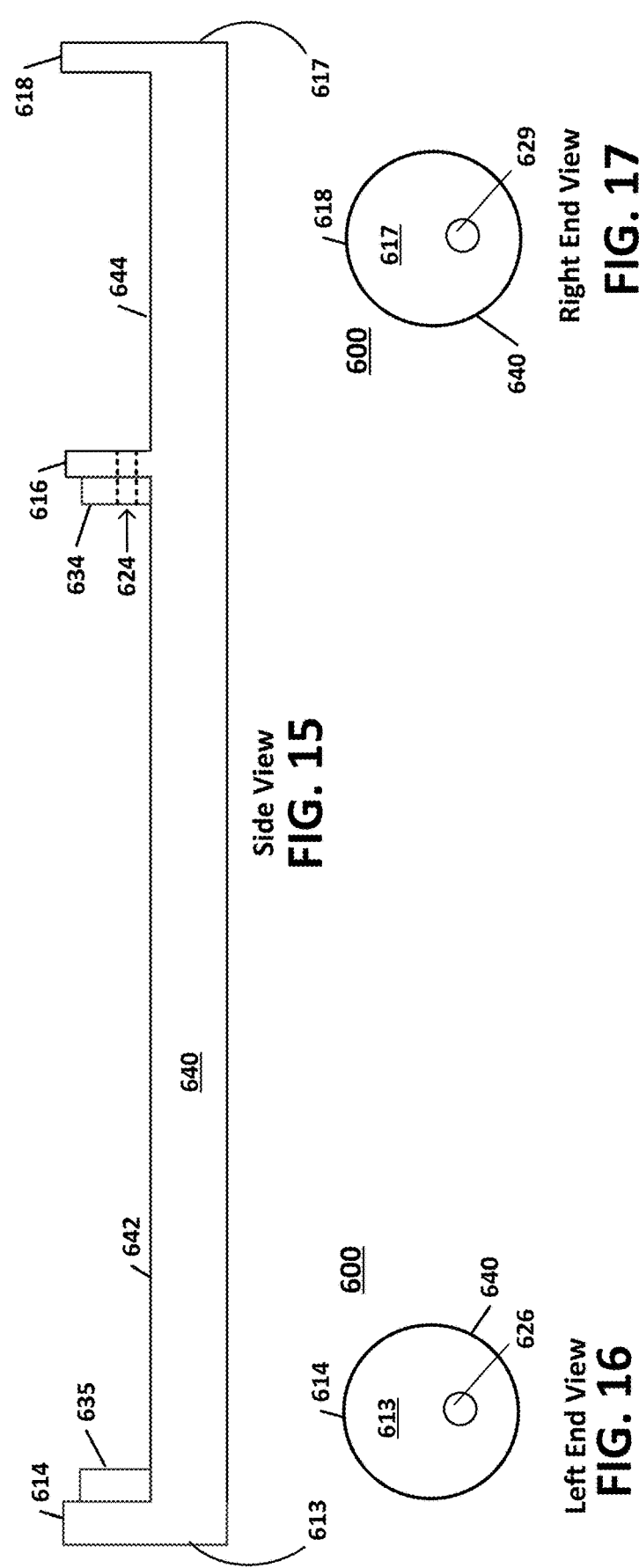
FIG. 15 is a side view of the housing base shown in FIG. 14.
FIG. 16 is an left end view of the housing base shown in FIG. 15.
FIG. 17 is a right end view of the housing base shown in FIG. 15.
Figures 18, 19, 20, 21, 22, 23:
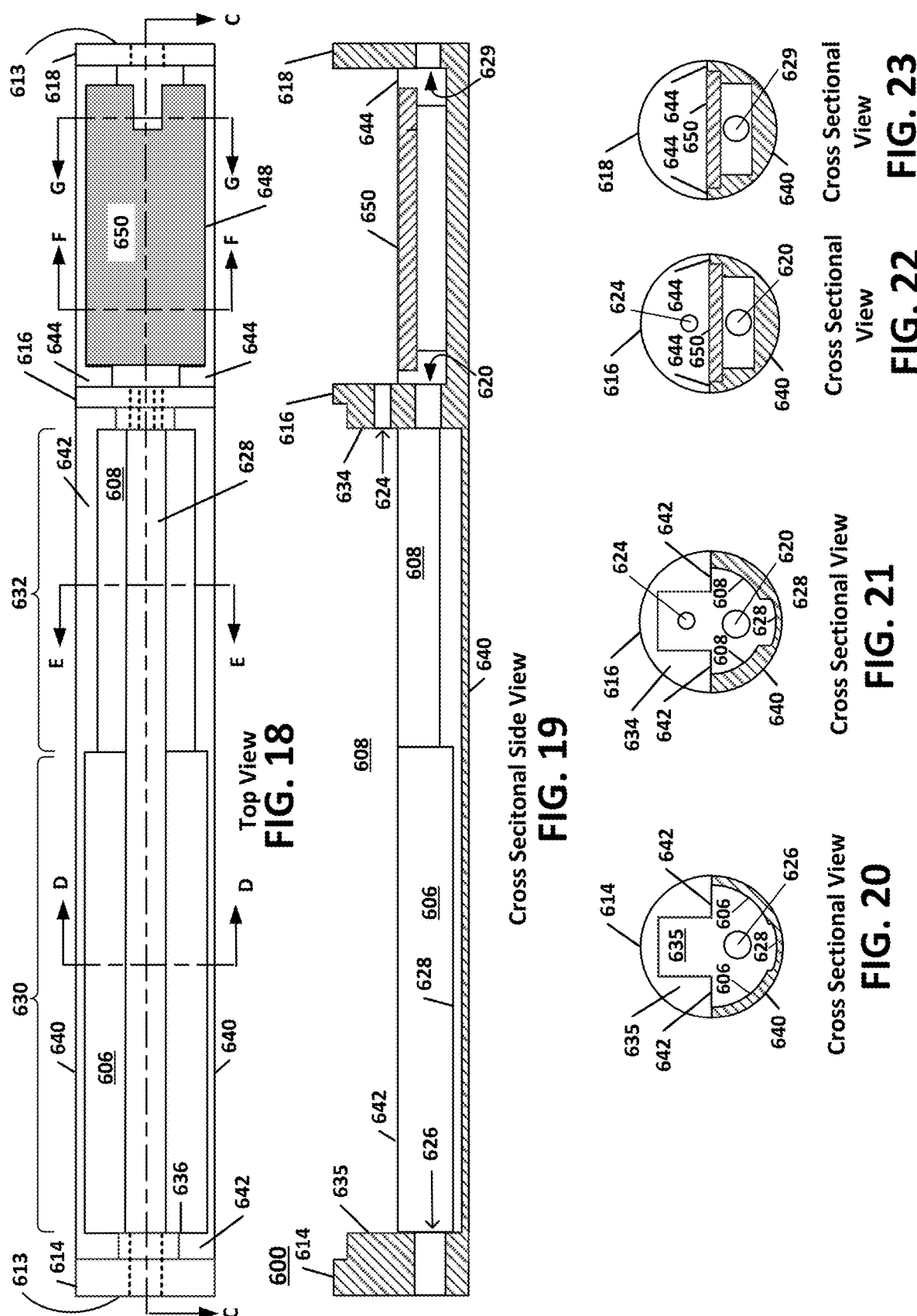
FIG. 18 reproduces the housing base shown in FIG. 14.
FIG. 19 is a cross-sectional view of the housing base shown in FIG. 18 taken along line C-C.
FIG. 20 is a cross-sectional view of the housing base shown in FIG. 18 taken along line D-D.
FIG. 21 is a cross-sectional view of the housing base shown in FIG. 18 taken along line E-E.
FIG. 22 is a cross-sectional view of the housing base shown in FIG. 18 taken along line F-F.
FIG. 23 is a cross-sectional view of the housing base shown in FIG. 18 taken along line G-G.

Base 600, first lid 712, and second lid 714 can be formed (e.g., machined) from solid pieces of metal (e.g., aluminum). Base 600, first lid 712, and second lid 714 are generally semi-tubular in shape. FIGS. 14-23 shows various features of base 600. FIGS. 14a, 14b, and 15 show base 600 when seen from above and a side. FIGS. 16 and 17 show base 600 when seen from the left and right ends. FIG. 18 is a copy of FIG. 14b. FIG. 19 is a cross-sectional view of base 600 shown in FIG. 18 taken along line C-C. FIGS. 20-23 are cross-sectional views of base 600 shown in FIG. 18 taken along lines D-D, E-E, F-F, and G-G, respectively.

Figures 24, 25, 26, 27, 28, 29:
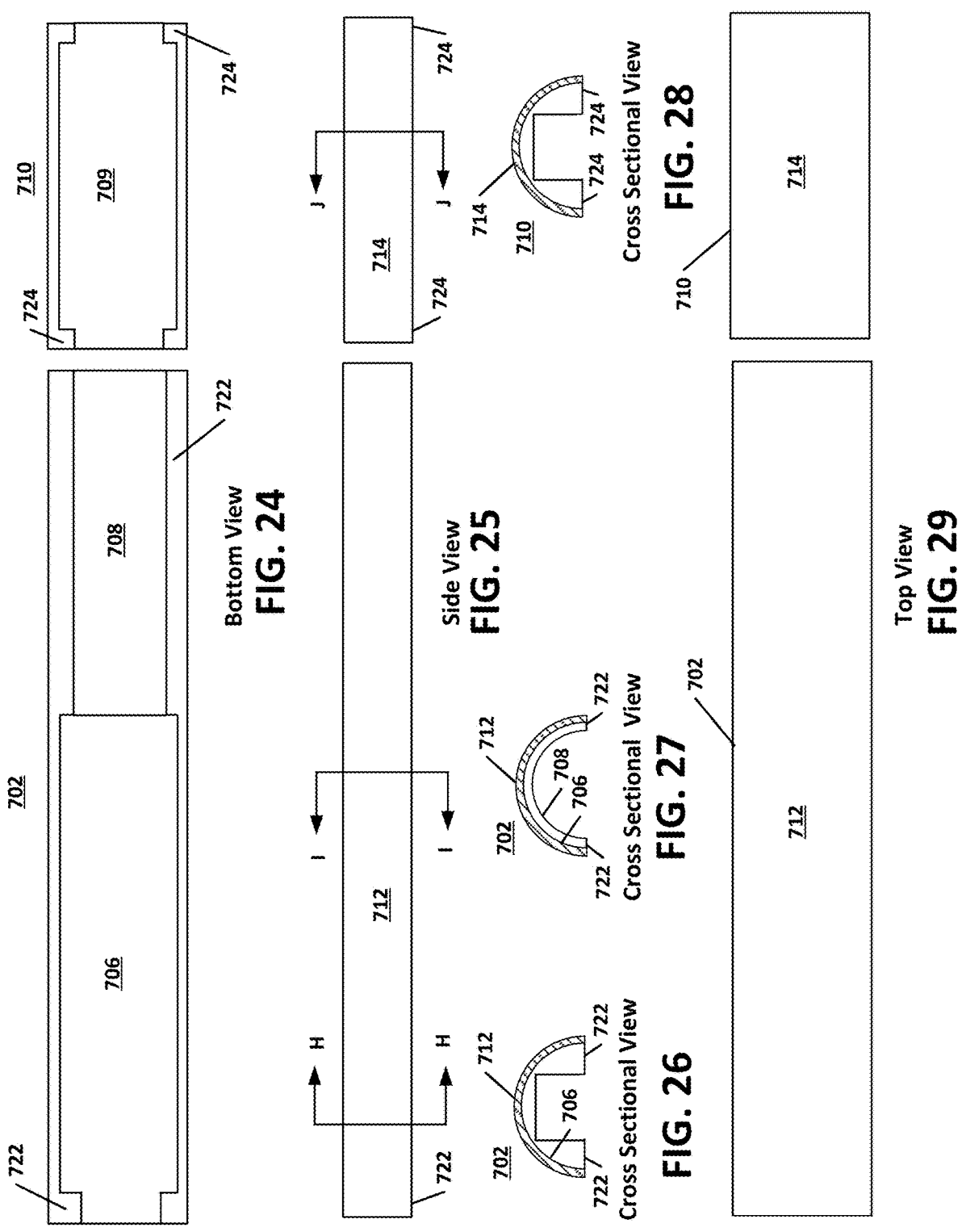
FIG. 24 are views of first and second lids when seen from below.
FIG. 25 are views of the first and second lids shown in FIG. 24 when seen from the side.
FIG. 26 is a cross-sectional view of the first lid shown in FIG. 25 taken along line H-H.
FIG. 27 is a cross-sectional view of the first lid shown in FIG. 25 taken along line I-I.
FIG. 28 is a cross-sectional view of the second lid shown in FIG. 25 taken along line J-J.
FIG. 29 are views of the first and second lids when seen from above.

FIGS. 24-29 show first and second lids 702 and 710. FIG. 24 shows first lid 702 and second lid 710 when viewed from below. FIG. 25 shows lids 702 and 710 when viewed from a side. FIG. 29 shows lids 702 and 710 when viewed from above. FIGS. 26-28 shows cross-sectional views of lids 702 and 710 taken along lines H-H, I-I, and J-J, respectively, of FIG. 25. First lid 702 has an outer semi-cylindrical surface 712, and second lid 710 has an outer-semi cylindrical surface 714. The curvature of surface 712 matches the curvature of surface 714. First lid 702 has inner semi-cylindrical surfaces 706 and 708, and second lid 710 has an inner semi-cylindrical surface 709. As will be more fully described below, the curvature of surface 706 matches the curvature of surface 408 of sensor 402 of FIG. 12 so that outer surface 408 of sensor 402 can contact surface 706, and the curvature of surface 708 matches the curvature of surface 410 of PMT 404 of FIG. 12 so that outer surface 410 of PMT 410 can contact surface 708. As will be more fully described below, the curvature of surface 708 matches a curvature of a molded PCB protection pad.

With continuing reference to FIGS. 14-23, base 600 has a semi-cylindrical outer surface 640. Base 600 extends laterally between flat, circular end surfaces 613 and 617 of end walls 614 and 618, respectively. Base 600 has a first portion 602 and second portion 604. As will be more fully described, first portion 602 can receive sensor 402, PMT 404, and wire set 310 of FIG. 12, and second portion 604 can receive the PCB 304 of FIG. 6 and one or more molded PCT protection pads. With continuing reference to FIGS. 24-29, first lid 702 includes flat surfaces 722 that can mate with corresponding flat surfaces 642 of base 600 shown in FIGS.

14-23 when first lid 702 is attached to base 600. Second lid 710 includes flat surfaces 724 that mate with corresponding flat surfaces 644 of base 600 shown in FIGS. 14-23 when second lid 702 is attached to base 600. When the first lid 712 is attached to base 600, first lid 712 and first portion. 602 form a first tubular shaped chamber that can substantially enclose sensor 402, PMT 404, and wire set 310 when received therein. When the second lid 714 is attached to base 600, second lid 714 and second portion 604 form a second tubular shaped chamber that can substantially enclose PCB 304 and the one or more molded PCB protection pads when received therein.

Returning to FIGS. 14-23, the first portion 602 includes cradles 630 and 632 with semi-cylindrical surfaces 606 and 608, respectively, upon which PMT 404 and gamma sensor 402 can respectively sit. The first portion also includes a slot extending between walls 614 and 616, and through cradles 630 and 632. The slot may define a flat surface 628 upon which a wire set 310 can sit.

Cradle 630 has semi-cylindrical surfaces 608 upon which sensor 402 can sit. The curvature of surfaces 606 substantially matches the curvature of outer cylindrical surface 408 of sensor 402 so that outer surface of sensor 402 can contact surfaces 606. Cradle 632 has semi-cylindrical surfaces 608 upon which PMT 404 can sit. The curvature of surfaces 608 matches the curvature of outer cylindrical surface 410 of PMT 404 so that outer surface of PMT 404 can contact surfaces 608.

After PMT 404 and gamma sensor 402 are received in their respective cradles 630 and 632, respectively, the first lid 712 can be releasably attached to base 600 using fasteners such as screws or bolts. When the first lid 712 is securely attached to base 600, inner semi-cylindrical surfaces 706 and 708 of the first lid 712 engage the outer cylindrical surfaces 408 and 410, respectively, of gamma sensor 402 and PMT 404 and/or tape stripes 502 and 504, respectively, attached thereto. Gamma sensor 402 and PMT 404 can be held firmly between the cradles 630 and 632, respectively, of base 600 and inner surfaces 706 and 708, respectively, of first lid 702 to inhibit or substantially reduce their radial movement during a drilling operation.

Wire set 310 can sit on slot surface 628 and in the space between surface 628 on one side, and sensor 402 and PMT 404 on the other side. Wire set 310 can extend through apertures 626, 620, and 629 formed in walls 614, 616, and 618 respectively. Apertures 620, 624, 626, and 629 are represented by hidden lines in FIGS. 14 and 15 but are more clearly shown in FIGS. 19-23. End wall 614 has an extension with a flat surface 635. Wall 616 has a similar extension with a flat surface 634. Flat surfaces 634 and 635 face each other. These extension surfaces 634 and 635 can engage respective spring mechanisms more fully described below, which press fit sensor 402 and PMT 404 together, and inhibit or substantially reduce axial movement of sensor 402 and PMT 404 when received by cradles 630 and 632, respectively. Base 600 includes flat surfaces 642 and 644. Flat surfaces 642 can contact corresponding flat surfaces of the first lid 702 when first lid 702 is fastened to base 600. Likewise surface 644 can contact a corresponding flat surface of the second lid 710 when second lid 710 is fastened to base 600.

Base 600 includes flat surfaces 646 to which a PCB mounting bracket can be attached. FIG. 14b shows the structure of FIG. 14a with a flat surfaced PCT mounting bracket 648 attached to flat surfaces 646. Although not shown, threaded fasteners may be used to attach mounting bracket 648 to flat surfaces 646. Respective PCBs can be mounted on opposite facing surfaces of bracket 648. A cavity is created beneath bracket 648 when it is attached to base 600. A PCB may be contained in this cavity. Wire set 310 may be positioned beneath this PCB in the cavity.

Figures 30, 31, 32:
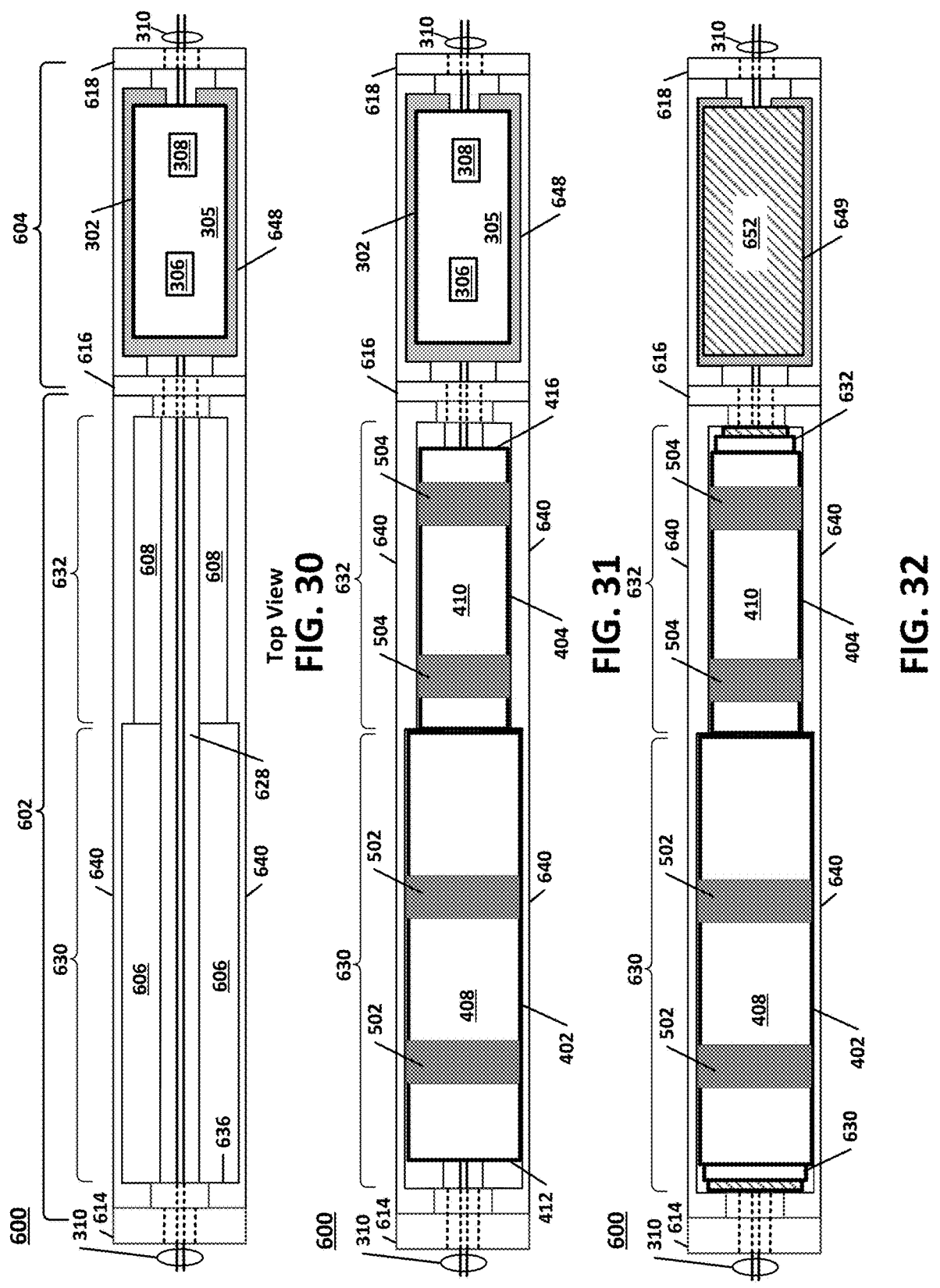
FIG. 30 shows the housing base of FIG. 14 when seen from above with the PCB of FIG. 6 added thereto.
FIG. 31 shows the housing base of FIG. 30 when seen from above with the sensor and PMT of FIG. 12 added thereto.
FIG. 32 shows the housing base of FIG. 31 when seen from above with spring biasing devices added thereto.

FIG. 30 shows base 600 of FIG. 14b with PCB 302 received on flat surface 650 of mounting bracket 648. Wire set 310 passes through apertures 626, 620, and 629 (see FIG. 19), and through the cavity under bracket 648. Some of these wires may be spliced in the cavity. Ends of additional wires not shown can be electrically connected to respective metal traces of PCB 302. These additional wires may extend through aperture 629 along with wire set 310. Wires of wire set 310 are positioned side-by-side on slot surface 628.

FIG. 31 shows base 600 after sensor 402 and PMT 404 are received in cradles 630 and 632, respectively. Sensor 402 and PMT 404 are radially received by base 600, as opposed to being axially received by housing 200 shown in FIGS. 2-13, thus avoiding damage top tape strips 502 and/or 506 described above. When received, surfaces of tape strips 502 and/or surface 408 of sensor 402 engages curved surfaces 606 of cradle 630. Likewise, tape strips 504 and/or outer cylindrical surface or town of PMT 44 engages the curved surfaces 608 of cradle 632.

Sensor 402 and PMT 404 can be spring biased towards each other so that their windows for 414 and 418 engage each other. FIG. 32 shows the structure of FIG. 31 after spring retainer mechanisms 630 and 632 are added to bias sensor 402 and PMT 404 against each other and to limit axial movement of sensor 402 and PMT 404 after they are received on cradles 630 and 632. Spring retainer mechanism 630 is positioned between and engages the end 412 of sensor 402 and surface 635 of end wall 614 (see also FIG. 15). Spring retainer mechanism 632 is positioned between and engages the end 416 of PMT 404 and surface 634 of wall 616 (see also FIG. 15). Each spring retainer mechanism may include a spring retainer that pulls a spring into a compressed state. With sensor 402 and PMT 404 received in their respective cradles, the spring retainer can be released to force sensor 402 and PMT 404 together. The compression of the springs can be implemented with the use of screws to provide rotational to linear force translation. The screws are used during assembly only and not present during normal tool operation. FIG. 32 also shows a dielectric PCB protection pad 649 with a semi-cylindrical outer surface 652 with a curvature that is substantially equal to the curvature of inner surface 709 of lid 710. Although not shown, a surface of pad 649 is molded to the shape of elements, including packaged circuits 306 and 308, mounted on PCB 302. The molded surface contacts the exposed surfaces of PCB 302 and elements mounted thereon.

FIG. 33 shows LWD tool 800 after lids 702 and 710 are attached to base 600 shown in FIG. 32. FIG. 34 shows LWD tool 800 of FIG. 33 with sensor 402, PMT 404, and protection pad 648 represented by hidden lines. FIG. 35 is a cross-sectional view of LWD tool 800 taken along line J-J of FIG. 34. As seen, the surface of tape strip 502 engages surface 706 of first lid 702 and surfaces 606 of cradle 630. Although not shown, surface 652 of pad 649 engages surface 709 of lid 710.

Although the present disclosure has been described in connection with several embodiments, the disclosure is not intended to be limited to the specific forms set forth herein. On the contrary, the present disclosure is intended to cover such alternatives, modifications, and equivalents as can be reasonably included within the scope of the disclosure as defined by the appended claims.

What is claimed is:

1. An apparatus comprising:
a base that extends laterally between first and second ends;
a radiation sensor received by the base, wherein the radiation sensor is cylindrically shaped and comprises an outer cylindrical surface that extends between first and second flat end surfaces;
a first lid that extends laterally between first and second ends, the first lid comprising a first semi-cylindrical surface;
wherein the first lid is releasably attached to the base;
wherein the outer cylindrical surface of the radiation sensor engages the base and the first semi-cylindrical surface of the first lid.

2. The apparatus of claim 1 further comprising:
a first strip of tape attached to the outer cylindrical surface of the radiation sensor;
wherein an outer surface of the first tape strip engages the base or the first semi-cylindrical surface of the first lid.

3. The apparatus of claim 2 wherein the outer surface of the first tape strip engages:
the base and the first semi-cylindrical surface of the first lid.

4. The apparatus of claim 1:
wherein the base comprises a first semi-cylindrical surface;
wherein the outer cylindrical surface of the radiation sensor engages the first semi-cylindrical surface of the base and the first semi-cylindrical surface of the first lid.

5. The apparatus of claim 4 further comprising:
a photo multiplier tube (PMT) received by the base, wherein the PMT is cylindrically shaped and comprises an outer cylindrical surface that extends between first and second flat end surfaces;
wherein the first lid comprises a second semi-cylindrical surface;
wherein the outer cylindrical surface of the PMT engages the base and the second semi-cylindrical surface of the first lid.

6. The apparatus of claim 5:
wherein the base comprises a second semi-cylindrical surface;
wherein the outer cylindrical surface of the PMT engages the second semi-cylindrical surface of the base and the second semi-cylindrical surface of the first lid.

7. The apparatus of claim 6 further comprising:
a second strip of tape attached to the outer cylindrical surface of the PMT;
wherein an outer surface of the second tape strip engages the second semi-cylindrical surface of the base or the second semi-cylindrical surface of the first lid.

8. The apparatus of claim 7 wherein the outer surface of the second tape strip engages the second semi-cylindrical surface of the base and the second semi-cylindrical surface of the first lid.

9. The apparatus of claim 6 further comprising:
a printed circuit board (PCB);
a second lid that extends laterally between first and second ends, the second lid comprising an outer semi-cylindrical surface;
wherein the second lid is releasably attached to the base;
wherein the base and second lid define an enclosure that contains the PCB.

10. The apparatus of claim 9 further comprising:
a first set of wires that connect the PMT to the PCB;
a second set of wires connected to the PCB;
a third set of wires connected to the PCB;
wherein the third set of wires are positioned between an inner surface of the base and the radiation sensor;
wherein the third set of wires are positioned between the inner surface of the base and the PMT.

11. The apparatus of claim 10;
wherein the base extends between first and second end walls;
wherein the first and second end walls define first and second apertures, respectively, through which the second and third sets of wires extend, respectively.

12. A logging while drilling (LWD) tool comprising:
a semi-tubular base comprising first and second portions;
a first semi-tubular lid releasably connected to the first portion, a combination of which defines a first enclosure;
a sensor contained in the first enclosure, wherein the sensor is cylindrically shaped and comprises an outer cylindrical surface that extends laterally between first and second flat end surfaces;
wherein the outer cylindrical surface of the sensor engages the first semi-tubular lid.

13. The LWD tool of claim 12 further comprising:
a photo multiplier tube (PMT) contained in the first enclosure, wherein the PMT is cylindrically shaped and comprises an outer cylindrical surface that extends laterally between first and second flat end surfaces;
wherein the outer cylindrical surface of the PMT engages the first semi-tubular lid.

14. The LWD tool of claim 13:
wherein the semi-tubular base comprises a semi-cylindrical outer surface;
wherein the first semi-tubular lid comprises a semi-cylindrical outer surface;
wherein the semi-cylindrical outer surface of the semi-tubular base and the semi-cylindrical outer surface of the first semi-tubular lid define an outer cylindrical surface.

15. The LWD tool of claim 13 further comprising:
a first strip of tape attached to the outer cylindrical surface of the sensor;
wherein an outer surface of the first tape strip engages the first portion or the first semi-tubular lid.

16. The LWD tool of claim 13:
wherein the first portion comprises a first pair of semi-cylindrical surfaces;
wherein the outer cylindrical surface of the sensor engages the first pair of semi-cylindrical surfaces and the first semi-tubular lid.

17. The LWD tool of claim 16:
wherein the first portion comprises a second pair of semi-cylindrical surfaces;
wherein the outer cylindrical surface of the PMT engages the second pair of semi-cylindrical surfaces and the first semi-tubular lid.

18. The LWD tool of claim 13 further comprising:
a printed circuit board (PCB);
a second semi-tubular lid releasably connected to the second portion, a combination of which defines a second enclosure;
wherein the second enclosure contains the PCB.

19. The LWD tool of claim 18 further comprising:
a first set of wires that connect the PMT to the PCB;
a second set of wires connected to the PCB;

a third set of wires connected to the PCB;

wherein the third set of wires extend in a space between an inner surface of the first portion and the sensor;

wherein the third set of wires extend in a space between the inner surface of the first portion and the PMT.

20. The LWD tool of claim 19;

wherein the semi-tubular base extends between first and second end walls;

wherein the first and second end walls define first and second apertures, respectively, through which the second and third sets of wires extend, respectively.

21. The LWD tool of claim 18 further comprising:

a cavity positioned between the PCB and the semi-tubular base;

a set of wires passing through the cavity and extending through the first and second portions.

22. The LWD tool of claim 13 further comprising:

a spring mechanism comprising a spring and a spring retention;

wherein the spring retention is configured to maintain the spring in a compressed state;

wherein the spring mechanism is positioned between the semi-tubular base and the PMT or the sensor;

wherein the spring is substantially released from the compressed state when the spring retention is removed from the LWD tool;

wherein the spring, when substantially released from the compressed state, presses the PMT against the sensor.

\* \* \* \* \*